United States Patent
Molsberry et al.

(10) Patent No.: US 8,745,373 B2
(45) Date of Patent: Jun. 3, 2014

(54) SYSTEMS AND METHODS FOR APPLYING ENCRYPTION TO NETWORK TRAFFIC ON THE BASIS OF POLICY

(75) Inventors: Frank Howard Molsberry, Georgetown, TX (US); Robert L. Winter, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 965 days.

(21) Appl. No.: 12/108,289

(22) Filed: Apr. 23, 2008

(65) Prior Publication Data
US 2009/0327695 A1 Dec. 31, 2009

(51) Int. Cl.
*H04L 29/06* (2006.01)

(52) U.S. Cl.
USPC .......................................... 713/153

(58) Field of Classification Search
USPC ............. 713/151, 153, 154; 726/1, 11, 12, 14
See application file for complete search history.

(56) References Cited

U.S. PATENT DOCUMENTS

| | | | | |
|---|---|---|---|---|
| 7,778,194 | B1* | 8/2010 | Yung | 370/252 |
| 2002/0004898 | A1* | 1/2002 | Droge | 713/151 |
| 2005/0175184 | A1* | 8/2005 | Grover et al. | 380/278 |
| 2005/0262573 | A1* | 11/2005 | Bo et al. | 726/27 |
| 2006/0233166 | A1* | 10/2006 | Bou-Diab et al. | 370/389 |
| 2007/0043940 | A1* | 2/2007 | Gustave et al. | 713/150 |
| 2008/0126559 | A1* | 5/2008 | Elzur et al. | 709/232 |

* cited by examiner

*Primary Examiner* — Brandon Hoffman
(74) *Attorney, Agent, or Firm* — Baker Botts L.L.P.

(57) ABSTRACT

An information handling system including a receiver for inbound data destined for delivery to a network node, an encryption recognition engine operable to identify whether the inbound data received by the receiver is encrypted and an encryption policy application engine operable to apply encryption policy to the inbound data on the basis of encryption properties identified by the encryption recognition engine in the inbound data. The system may further include an encryption engine operable to selectively encrypt the inbound data on the basis of the encryption policy as applied by the encryption policy application engine and a packet delivery engine operable to deliver the inbound data to its destination.

20 Claims, 4 Drawing Sheets

SYSTEMS AND METHODS FOR APPLYING ENCRYPTION TO NETWORK TRAFFIC ON THE BASIS OF POLICY

BACKGROUND

1. Technical Field

The present disclosure relates generally to the field of information handling systems and networks. More specifically, but without limitation, the present disclosure relates to encryption of data across network links.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It has been recognized that data transferred among information handling systems (IHSs) or network traffic may transit insecure network nodes and segments, and is susceptible to interception and falsification. Therefore, methods and protocols have been developed to encrypt network traffic from prying eyes and surreptitious control. Some forms of encryption are under software control, that is, they are performed by applications at the source. The destination is thus not necessarily dependent on network-type encryption because data can be transmitted through non-network means such as the mailing of physical media. Other forms of encryption are performed in conjunction with the transmission of network data which generally occurs at the data link, network, or transport layers, which are hereafter referred to as network-type encryption.

In the past, implementations of network-type encryption have been fixed in the network traffic passing between two points and are always encrypted. Thus, data passing between two nodes implementing the network-type encryption is encrypted regardless of the data content. Furthermore, networks can be designed that implement more than one type of encryption, which would result in duplicate of encryption if one type of encryption provided sufficient protection.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides an information handling system including a receiver for inbound data destined for delivery to a network node, an encryption recognition engine operable to identify whether the inbound data received by the receiver is encrypted and an encryption policy application engine operable to apply encryption policy to the inbound data on the basis of encryption properties identified by the encryption recognition engine in the inbound data. The system may further include an encryption engine operable to selectively encrypt the inbound data on the basis of the encryption policy as applied by the encryption policy application engine and a packet delivery engine operable to deliver the inbound data to its destination.

Another aspect of the disclosure provides a method for applying encryption to packets on the basis of policy instructions where the method includes the steps of receiving packets, identifying traffic to which the packet is a part and testing for presence of encryption in the packet. The method may further include applying policy to the results of the testing, wherein the policy specifies handling for the packet that tests positive or negative for encryption of a particular type applying encryption of a type indicated in the applying of policy, if the packet tests positive or negative for encryption of the particular type and transmitting the packet.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Portions of the present disclosure, detailed description and claims may be presented in terms of logic, software or software implemented aspects typically encoded on a variety of media or medium including, but not limited to, computer-readable media, machine-readable media, program storage media or computer program product. Such media may be handled, read, sensed and/or interpreted by an IHS (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Figure 1:
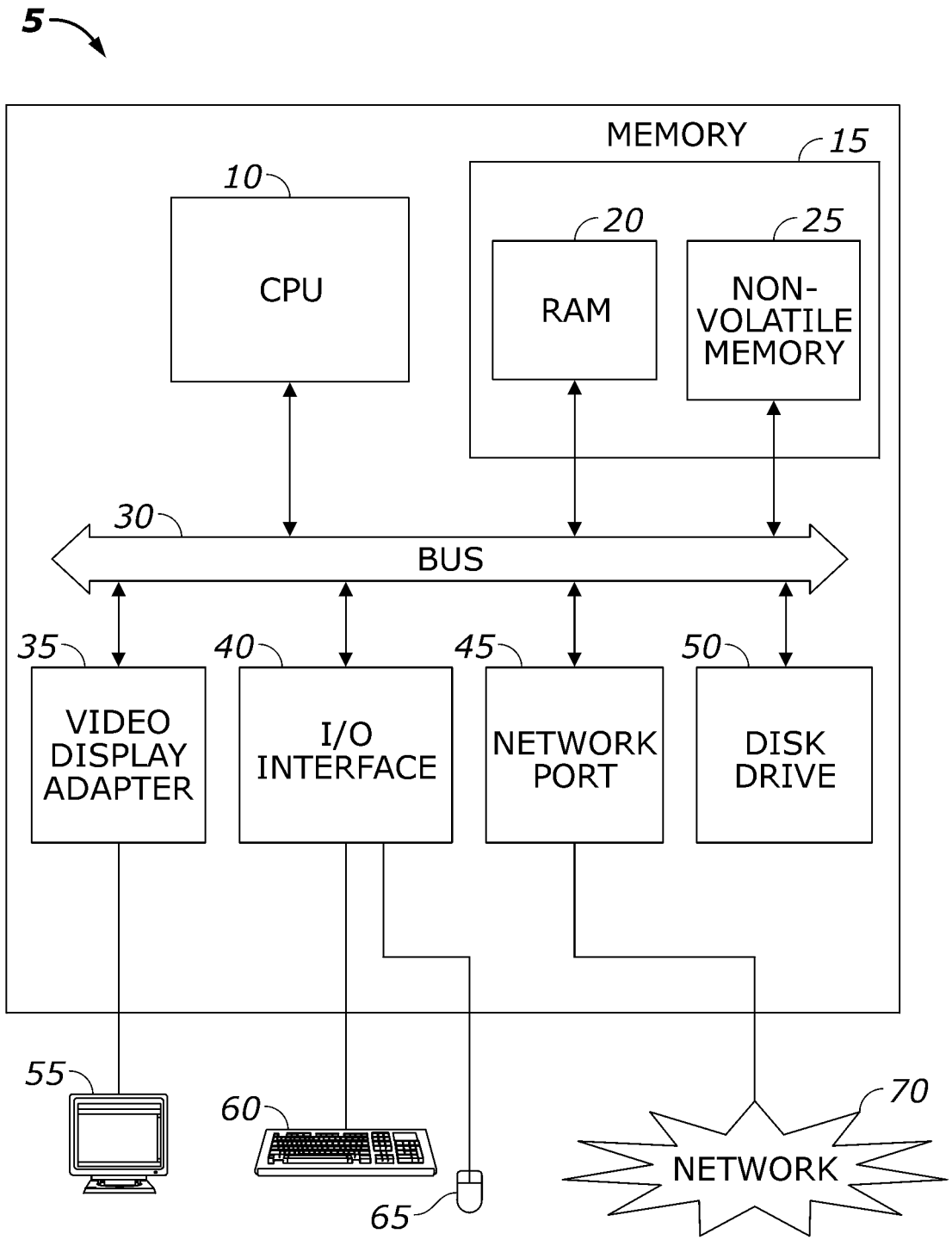
FIG. 1 depicts an illustrative schematic of an information handling system (IHS) according to the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic/input output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

The discussion below concerns information handling systems (IHSs) that transfer and encrypt network traffic for which a brief review of networking principles is helpful. First referring to FIG. 2, the transit of data across a network encompasses communications at several different levels. The Open Systems Interconnection (OSI) model is a widely understood way of understanding this principle. The lowest level, the physical layer, defines the data communications between a sender and receiver, or to transceivers, which could utilize any number of mediums or protocols. Traffic at the physical layer is not truly network traffic, because transit of the data is made directly between two nodes, assuming that the transmission is not a broadcast. At the physical layer encryption is generally not needed in networks, although it could be applied where the possibility of interception exists.

The next higher level of processing occurs at the data link layer, which defines communication from network node to network node. In the example shown in FIG. 2, communication is by an Ethernet protocol which uses MAC addresses to identify nodes that may be on the same physical link. Above the data link layer is the network layer that permits communication between subnetworks. In this example, the network layer uses the Internet Protocol that addresses network nodes by an IP address. Above the network layer are other layers that utilize the protocol of the network layer to achieve communications between nodes of the network, for example Transport Layer Security (TLS) and the Secure Sockets Layer (SSL). Generally speaking, communication links at this level exist as streams of data between network nodes on a connection-based protocol.

Figure 2:
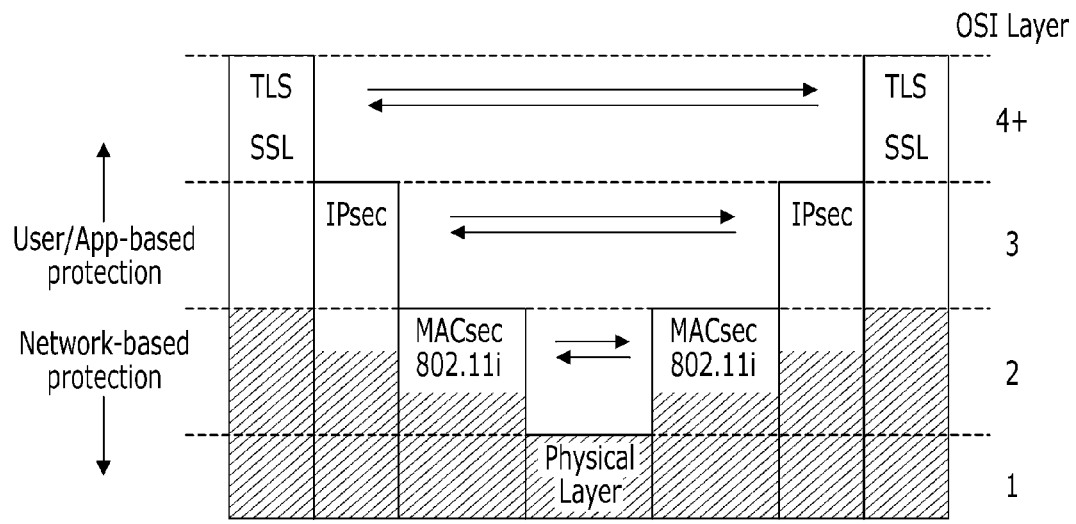
FIG. 2 depicts a network layer hierarchy according to the Open Systems Interconnect (OSI) model.

Forms of encryption, represented by shading in FIG. 2, may be performed in conjunction with the transmission of network data which generally occurs at the data link, network, or transport layers, which are hereafter referred to as network-type encryption. Examples of encryption protocols at the data link level are IEEE 802.11i and 802.11AE (MACsec) protocols, which encrypt data between nodes coupled by a means of communication such as, by a radio link or by a wire. IPsec is an example of a network layer encryption protocol, transferring encrypted data between two network nodes at specific IP addresses. TLS and SSL can occur at the transport layer or higher, and are used to transport streams of data between two points on a network. These protocols can be implemented as tunneling protocols, by which encrypted packets may be sent from one node to another on a potentially insecure network, by which a tunnel may be established that acts as a direct link between two network nodes that are not directly connected. Also note that in network-type encryption it may be necessary to negotiate a link between two connected nodes, unless packets or other identifiable data segments are individually and separately encrypted.

Note that the description here of levels based on the OSI model and particular types of network-type encryption is merely exemplary, and it is possible for a network to omit some of these layers or add intermediate layers while still retaining the layered structure of higher and lower levels. Thus the discussion herein is not limited to the OSI model, but may be used in any network hierarchy of levels of communication.

Figure 3:
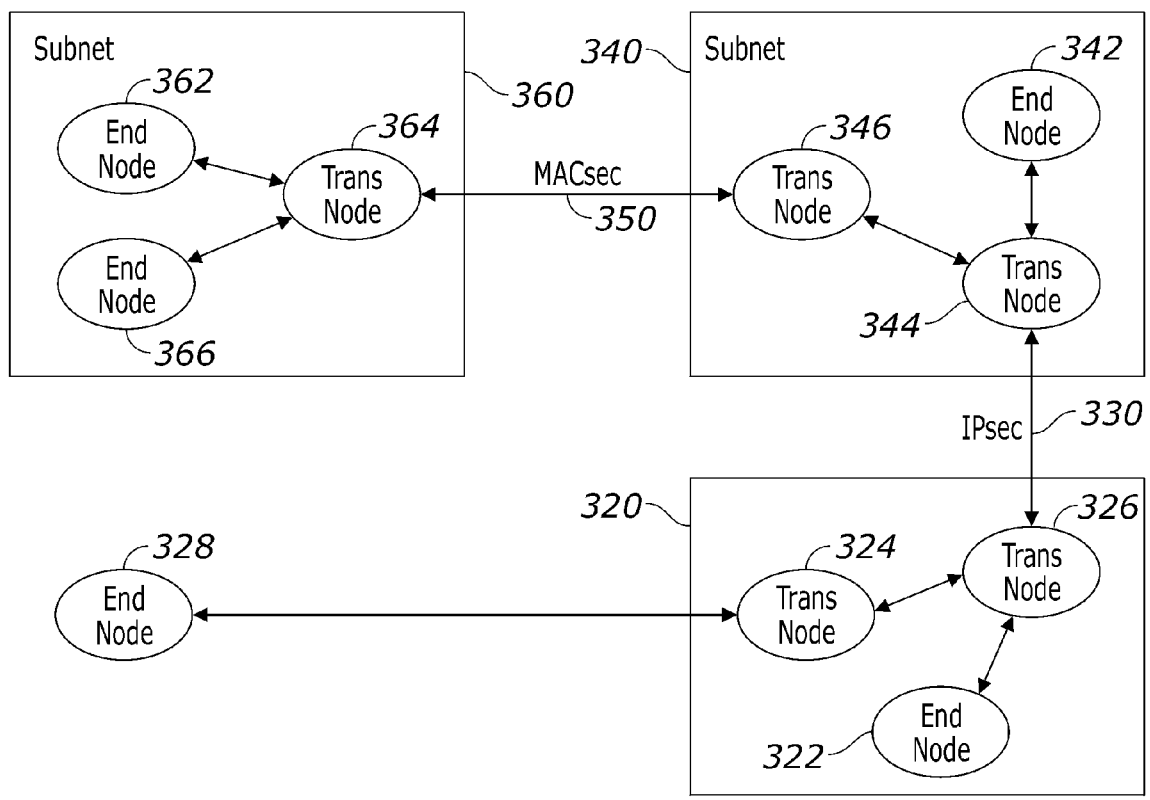
FIG. 3 depicts an exemplary network having end nodes and transfer nodes arranged in subnetworks connected by potentially insecure links.

The present systems and methods may be better understood with reference to the exemplary network shown in FIG. 3. This network, like many, consists of subnets that have been added on over time as the network has grown. For example, subnet 320 may have been established in a controlled portion of a building entirely controlled by a company, thus not requiring any security to protect the traffic between its internal nodes. The company may have added at some later time additional network nodes and another subset 340 in another controlled portion of a building. However the link 330 (e.g., IPsec) between these subnets may exist in an uncontrolled area, for example, between buildings or in an area not controlled by the company. Therefore, link 330 was selected to be an encrypted link with the encryption being performed by transfer nodes 344 and 326. Hereinafter, a transfer node means a network node that provides a connection from a node or subnetwork to another subnetwork which could, for example, be a network switch or router. Encrypted, for the purposes of this disclosure, means to be obfuscated from unintended third parties through the use of a reversible mathematical, computational and/or cryptographic transformation by way of a private key transmitted between a receiving and a transmitting party. A private key may be, for example, randomly generated data, a selected key phrase, a sequence of transformative steps or other information that is one of a number of possible permutations made available by the mathematical or cryptographic transformation.

At some later time a third subnetwork 360 was added with a new encrypted link 350 (e.g., MACsec) connecting the subnetwork to the general network of FIG. 3. The third subnetwork 360 may be connected by transfer nodes 364 and 346 through the use of packet encryption. In the network of FIG. 3, end nodes 362, 366, 342 and 322 exist throughout in various places. Through the use of encrypted links 330 and 350, the network can be considered as a whole to be secure, even though there may be parts that are susceptible to the interception of encrypted data for which a key is unknown.

Consider now an end node 328 that does not exist inside the network, but for which network communication is important. For example, end node 328 may be the home computer of an employee that is accessing the network over a dial-up line or even over the Internet. The path between end node 328 and transfer node 324 is unknown and of unknown security, and it would be unwise to allow the end node 328 to access the network without providing some security. Because the path is unknown, encryption protocols at the data link and network layers are impractical, and providing an encrypted link between these would be done at the transport or higher layer such as through the SSL or TLS protocols.

Now suppose that the employee at end node 328 wishes to access end node 362, and thereby establishes a secure shell or an encrypted virtual console connection. Traffic will traverse the network between transfer nodes 324, 326, 344, 346 and 364, substantially all of that traffic being encrypted using, for example, SSL encryption. This may result in the traffic at links 330 and 350 being doubly encrypted. It may be company policy that the SSL encryption is sufficient, and therefore the encryption at transfer nodes 326, 344, 346 and 364 is unnecessary. Duplicate data for the purposes of this disclosure means data that is identical to inbound data in the encryption sense. Duplicated data is the data that is not required to be decoded by a downstream network consumer through an additional step. Duplicate outbound data might be a packet, however the packet header and/or transmissive information could be modified as it passes through a network, for example through the use of the DHCP protocol or by the changing of a time-to-live value, without causing that data to become non-duplicative. Below are descriptions of systems and methods that can reduce or eliminate this double encryption.

Figure 4:
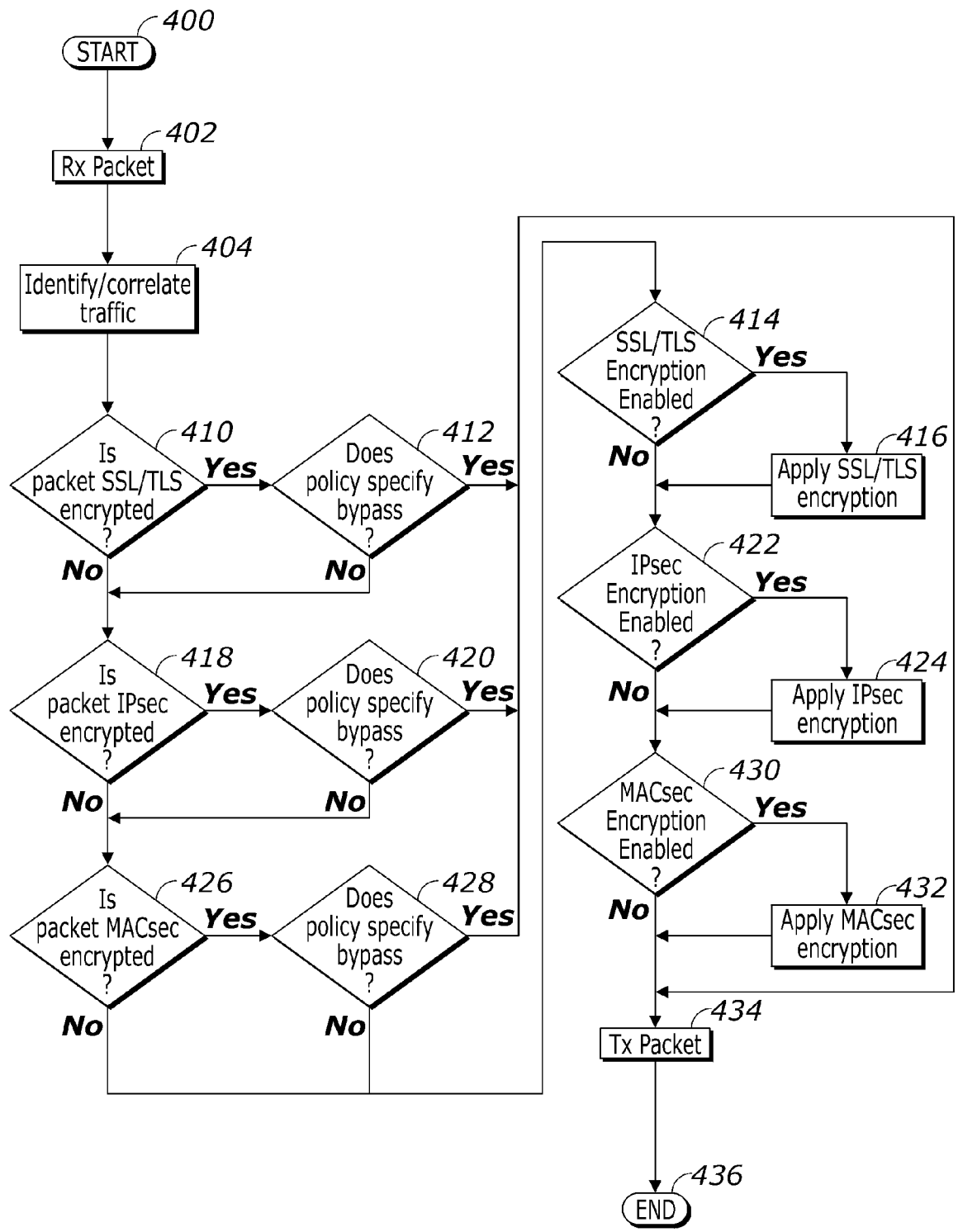
FIG. 4 depicts an exemplary method of applying encryption policy using a layered-hierarchical approach.

FIG. 4 depicts an exemplary method of applying encryption policy in accordance with the principles described for the IHSs and organizations described herein, useful to selectively apply encryption to inbound data by policy utilizing a layer-hierarchical approach, with a start step 400 and an end step 436. The application of the method begins with the reception of a packet in step 402, followed by the traffic of which the received packet is a part is identified and/or correlated in step 404. For example, if the packet is part of an SSL session, it may be identified as part of a data stream defined by an earlier protocol handshake. If the packet is not part of the stream, it may be identifiable through the examination of packet headers or by correlation to a particular source or protocol of use. The method proceeds to inquire in step 410 whether the packet is encrypted according to the SSL or TLS protocols. If yes, the policy is examined in step 412 to see if it specifies bypass of encryption. If bypass is not specified, the method proceeds to determine whether the packet has an IPsec identity in step 418, and if so whether policy specifies bypass in step 420 for packets so-encrypted. If either of those is false, the packet is checked for a detection of a MACsec identity in step 426 and whether policy specifies a bypass.

If a bypass is selected, no further encryption is necessary and the packet is transmitted to the next node in step 434. Otherwise, the method examines the policy for specification of SSL/TLS encryption in step 414, IPsec encryption in step 422 and MacSec encryption in step 430, and applies suitable encryption in one or more of steps 416, 424, and 432. Thus, it may be understood that the method of FIG. 4 applies three criteria for non-encryption, and three global criteria for encryption by cryptographic type.

Figure 5:
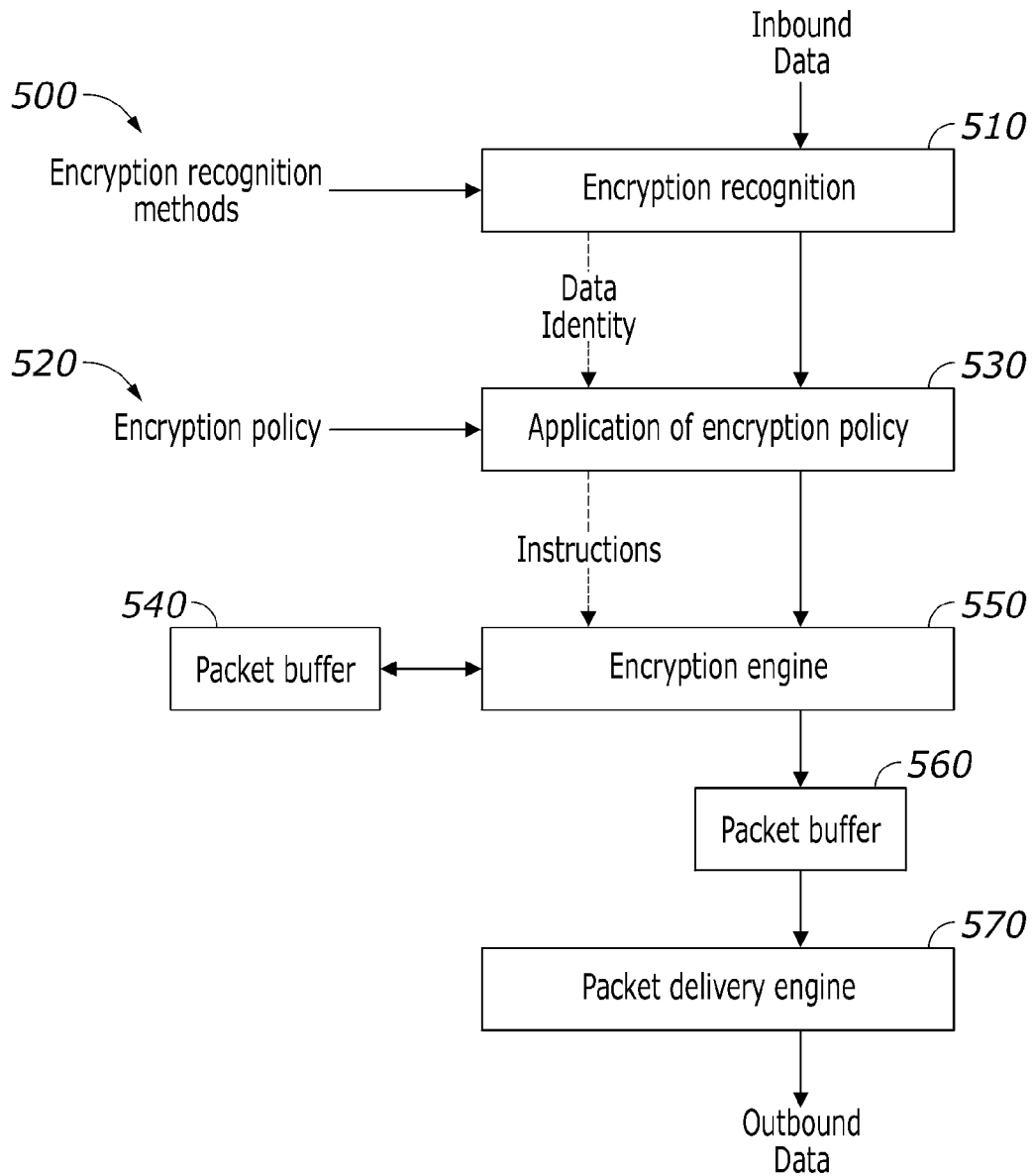
FIG. 5 depicts the elements of one implementation of an IHS that implements encryption on the basis of policy.

FIG. 5 depicts the elements of one possible implementation of an IHS that implements encryption on the basis of policy, which in some cases can prevent the application of duplicate encryption. It should be understood that the present disclosure has applicability to IHSs as broadly described above, and is not intended to be limited to the system as specifically described in connection with FIG. 5. The first component of the exemplary device of FIG. 5 is an encryption recognition engine 510 that receives inbound data destined for delivery to another network node. In this example, encryption recognition is performed by encryption recognition methods 500 which are programming that provides a true or false indication to the question of whether the inbound data is encrypted at a particular network level. In some cases, this may be done merely by examining a flag or other indicator present in a packet that is set for encrypted packets. For example, the MACsec 802.11AE protocol may use the specific "Ethertype" of 0x88E5 to identify encrypted Ethernet packets. In other cases, this may be done by monitoring the interactions between two nodes with traffic passing through, especially where an encrypted session is established. For example, the establishment of an SSL session involves the interaction on particular ports and the transfer of a digital certificate. The encryption recognition methods may include programming and state memory needed to track the development of an encrypted session. In another example, communication on a particular port might be sufficient to indicate that encryption is present. For example, communications on port 443 are generally reserved for HTTPS session negotiation, part of which negotiation is a port on which encrypted data is passed. Note that the data identity or instructions may be implied through program state, and thus no variables containing this information are necessary.

In any event, the encryption recognition engine 510 produces an identity for the inbound data which may identify the type of encryption, the layer of encryption or identify no recognized encryption present. That identity is passed to engine 530 for the application of encryption policy 520. Encryption policy 520 may be permanent, that is, fixed in programming instructions, or it may be configurable. The encryption policy may reference only network stack levels. For example, a policy may specify that if encryption is provided in the network layer, no further encryption should be applied. Policy may also reference other information such as source or destination subnetworks, port numbers, traffic type, other network specifications or information and the like.

The application of encryption policy results in the association of instructions to the inbound data, both of which information is provided to an encryption engine 550. Encryption engine 550 selectively encrypts the inbound data on the basis of the encryption policy, which specifies what kind of encryption to apply, using the provided instructions. In some cases, inbound data is not immediately capable of encryption due to the lack of necessary information. For example, in many networks, packets are allowed to arrive out of order and the receipt of an earlier packet may be necessary for the encryption of a later one. In one case, an encryption key is not identifiable because the packets associated with a negotiation event has not yet arrived. In another case, the method of encryption relies on earlier packet data as input to the encryption for the current packet, i.e., the data is not encrypted by individual packets but as a stream. If inbound data is not encryptable due to missing information, it may be placed in the packet buffer optionally with the instructions for later encryption when the necessary information is available.

The inbound data, once encrypted by encryption engine 550, is placed in a packet buffer 560 to await delivery. A packet delivery engine 570 transmits the outbound data and performs network administrative tasks such as prioritizing packet data and sending packets to an appropriate network port. Packet buffers 540 and 560 may not be needed in some circumstances, for example in a sequential network protocol that enforces the order of packet data.

Figure 6:
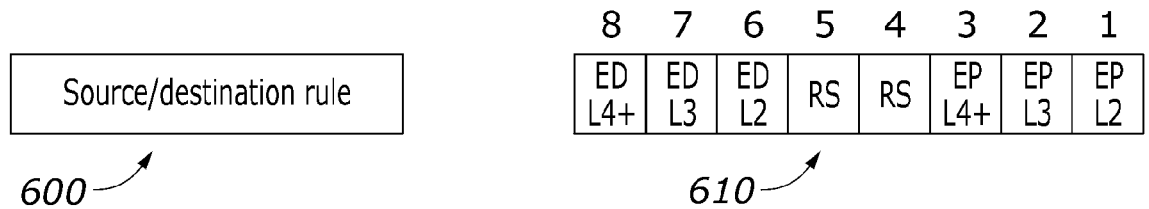
FIG. 6 depicts an exemplary encryption policy organization pairing a source/destination rule and an encryption byte.

Now shown in FIG. 6 is an exemplary encryption policy organization which pairs a source/destination rule 600 and an encryption field 610, which in this example is a byte. The encryption byte 610 has a format as follows: bits six through eight specify whether encryption at the particular level (level 2 for bit 6, level 3 for bit 7 and level 4 or more for bit 8) is available to apply. Bits one through three specify the encryption policy, i.e., whether encryption should be applied if encryption is or is not identified at the specified levels (level 4 or more at bit 3, level 3 at bit 2, and level 2 at bit 1). Using the example of FIG. 6, suppose that bit six was set and bits seven and eight were not set in a particular device, indicating that only encryption at the data link layer was available. Further suppose that bit 3 is set while bits 2 and 1 are not. This might specify that inbound data encrypted only with a transport layer protocol (i.e., TLS or SSL) would be further encrypted, while inbound data encrypted with a data link layer or a network layer protocol would not be further encrypted. The particular organization of encryption byte 610 is merely exemplary, and any conventional organization may be used.

Likewise, the source/destination rule 600 can take many forms, and in one form the pair formed by encryption byte 610 and source rule 600 may be combined into an SNMP MIB object. Rule 600 may specify a default encryption byte or may specify another encryption byte to use in the event that inbound data comes from particular sources or is destined to particular destinations. For example, it may be known that certain inbound data will be traversing completely inside a corporate network, and thus less stringent encryption policies are needed because the data is less susceptible to interception and/or interference. In another example, it may be known certain inbound data arriving from certain nodes or being sourced from certain nodes does not contain sensitive data, i.e., data that comes from a web server containing only publicly-accessible information. Another kind of rule could also be used as desired, such as a rule specifying certain ports or informational types. Policy may specify that encryption be applied according to node identity (e.g., IP address), by its source (e.g., Mac address), by traffic type identified by a port or through the use of an analyzer where a port by itself is insufficient, time of day, etc. However, a source/destination rule is not necessary, and in one example the encryption byte is the only configuration provided at a node; the decision of whether or not to encrypt is made only on that policy basis.

Herein is recognized that some kinds of encryption may be considered better than others in certain contexts, i.e., they are less susceptible to attack or are more processor-efficient. Policy may be developed for a network or a subnetwork incorporating policy-based encryption decisions recognizing that for certain network links strong encryption policies may be appropriate while other network links may need only weak encryption. Thus, for the nodes of the network, the encryption policies may vary according to the particular local needs and circumstances. For example, it may be desirable to implement node to node (level 2) or network-type (level 3) encryption where encryption at a higher level is insufficient, either because the encryption applied is weak or because the strength of the encryption may be uncertain. More particularly, SSL-based encryption may rely on the key of a third party, of which it is unknown whether the reverse-key has been discovered, and thus an organization may decide in its policy that all SSL-based encryption or encryption at the transport layer or higher must be supported with additional encryption at a lower level. Note also that it is not necessary for every transit node to implement encryption decisions based on policy, rather some transit nodes may encrypt always without impacting security of connections or the transmission of data.

Although particular systems, functions and methods have been described above, they are adaptable to other systems having different networking layered structures, organizations and encryption types and methods. Thus, the inventions are not limited to the particular implementations described herein. Likewise, although the described functions have been described through the use of block diagrams and in hardware, one of ordinary skill in the art will recognize that most if not all of the functions described herein may be implemented in software as well. Additionally, the exact configurations described herein need not be adhered to, but rather the diagrams and architectures described herein may be varied according to the skill of one of ordinary skill in the art. Moreover, although reference is made to electronics, circuitry and software in the exemplary systems, it is to be recognized that functions implemented in electronics or circuitry may often be implemented in software, and vice versa, and thus it is contemplated herein that software elements might be implemented in electronics with or without a processor executing software, and electronic aspects can likewise be implemented in software. In general, the present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. An information handling system including a multi-layer network including a data link layer, a network layer, and a layer above the network layer, each layer constituting a particular network level and being capable of encrypting data passing there through, the information handling system comprising:

a receiver for inbound encrypted data destined for delivery to a network node, the inbound data having a field identifying encryption properties of the data including the identity of the network level at which the inbound data received by the receiver is encrypted;

an encryption recognition engine operable to identify the network levels at which the inbound data received by the receiver is encrypted and wherein the encryption recognition engine is further operable to determine whether the inbound data is encrypted at the particular network level;

an encryption policy store containing an encryption policy specifying encryption to apply to data encrypted at particular network levels, the store comprising information indicating encryption capabilities of the information handling system for three network levels and information indicating whether encryption should be applied for the three network levels based on a predefined encryption level policy;

an encryption policy application engine operable to apply the encryption policy of the encryption policy store to the inbound encrypted data on the basis of network level encryption properties identified by the encryption recognition engine in the inbound data;

an encryption engine operable to selectively and additionally encrypt the inbound encrypted data on the basis of the encryption policy as applied by the encryption policy application engine; and a packet delivery engine operable to deliver the inbound data to its destination.

2. The system of claim 1, wherein the encryption recognition engine is operable to identify a network level of encryption for the inbound data.

3. The system of claim 1, wherein the encryption recognition engine is operable to identify a type of encryption for the inbound data.

4. The system of claim 1, wherein the encryption recognition engine is operable to identify an absence of encryption for the inbound data.

5. The system of claim 1, wherein the encryption policy application engine is operable to produce an association of instructions to the inbound data.

6. The system of claim 1, wherein the encryption policy application engine is operable to produce instructions specifying a kind of encryption to the inbound data, and further wherein the encryption engine applies encryption as specified by the instructions.

7. The system of claim 1, wherein the encryption policy application engine is operable to apply policy that comprises a source rule, destination rule and an encryption field specifying whether encryption at the particular network level is available and whether encryption should be applied if encryption is identified at specified network levels.

8. The system of claim 1 further comprising an encryption engine packet buffer, and further wherein the system buffers packets prior to encryption on condition that the packets contain data that is not immediately encryptable.

9. The system of claim 1, wherein the system further comprises encryption recognition methods, and further wherein the encryption recognition engine utilizes the encryption recognition methods to indicate whether inbound data is encrypted at the particular network level.

10. A method of applying encryption to packets on the basis of policy instructions in an information handling system comprising a multi layer network including a data link layer, a network layer, and a layer above the network layer, each layer constituting a given network level and being capable of encrypting data passing there through, the method comprising the steps of:

receiving encrypted data packets, the received packets having a field identifying encryption properties of the data at given network levels;

identifying traffic to which the packet is a part;

testing for presence of the field in the packet;

applying policy to the results of the testing, wherein the policy specifies handling for the packet that tests positive or negative for encryption of a particular type at the given network level, the policy indicating encryption capabilities of the information handling system for three network levels and indicating whether encryption should be applied for the three network levels based on a predefined encryption level policy;

applying additional encryption of a type indicated in the applying of policy, if the packet tests negative for encryption of the particular type at the given network level; and transmitting the packet.

11. The method of claim 10, wherein the policy specifies different handling on the basis of a presence or absence of encryption at different network levels.

12. The method of claim 10, wherein the policy specifies bypass of further encryption if the packet tests positive for encryption of a particular type.

13. The method of claim 10, wherein in applying encryption to the packet, the policy indicates whether to apply encryption for at least one network level selected from the group consisting of network levels 2, 3 and 4.

14. The method of claim 10, wherein in applying encryption to the packet, the policy indicates whether to apply encryption for at least one network layer selected from the group consisting of a data link layer, a network layer, and a layer above the network layer.

15. The method of claim 10, wherein in the testing for the presence of the field, the testing identifies existing encryption for at least one network level selected from the group consisting of network levels 2, 3 and 4, if encryption is present in the at least one network level.

16. A method according to claim 10, wherein in the testing for the presence of the field in the packet, said testing identifies existing encryption for at least one network level selected from the group consisting of a data link layer, a network layer, and a layer above the network layer, if encryption is present in the at least one network level.

17. A non-transitory computer-readable medium comprising instructions for applying encryption to packets on the basis of policy instructions in an information handling system comprising a multi layer network including a data link layer, a network layer, and a layer above the network layer, each layer constituting a given network level and being capable of encrypting data passing there through, the instructions, when executed by a processor, configured to:

receive encrypted data packets, the received packets having a field identifying encryption properties of the data at given network levels;

identify traffic to which the packet is a part;

test for presence of the field in the packet;

apply policy to the results of the testing, wherein the policy specifies handling for the packet that tests positive or negative for encryption of a particular type at the given network level, the policy indicating encryption capabilities of the information handling system for three network levels and indicating whether encryption should be applied for the three network levels based on a predefined encryption level policy;

apply additional encryption of a type indicated in the applying of policy, if the packet tests negative for encryption of the particular type at the given network level; and transmit the packet.

18. The computer-readable medium of claim 17, wherein the encryption recognition engine is operable to identify a network level of encryption for the inbound data.

19. The computer-readable medium of claim 17, wherein the encryption recognition engine is operable to identify a type of encryption for the inbound data.

20. The computer-readable medium of claim 17, wherein the encryption recognition engine is operable to identify an absence of encryption for the inbound data.

* * * * *